US006785756B2

(12) United States Patent
Candea et al.

(10) Patent No.: US 6,785,756 B2
(45) Date of Patent: Aug. 31, 2004

(54) METHODS AND SYSTEMS FOR MULTI-POLICY RESOURCE SCHEDULING

(75) Inventors: George M. Candea, Mountain View, CA (US); Harvey Eneman, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 435 days.

(21) Appl. No.: 09/852,490

(22) Filed: May 10, 2001

(65) Prior Publication Data

US 2002/0169907 A1 Nov. 14, 2002

(51) Int. Cl.$^7$ .......................... G06F 13/22; G06F 17/30

(52) U.S. Cl. ........................................ 710/220; 707/10

(58) Field of Search ........................... 710/220, 46, 47, 710/107, 109, 260, 261, 264, 267, 268; 709/100, 102, 104; 707/10

(56) References Cited

U.S. PATENT DOCUMENTS

| 5,307,496 A | 4/1994 | Ichinose et al. | |
|---|---|---|---|
| 6,457,008 B1 * | 9/2002 | Rhee et al. | 707/10 |
| 6,584,489 B1 * | 6/2003 | Jones et al. | 709/104 |

FOREIGN PATENT DOCUMENTS

| EP | 0658841 | 6/1995 |
|---|---|---|
| EP | 0880095 | 11/1998 |
| WO | WO99/12097 | 3/1999 |
| WO | WO01/84301 | 11/2001 |

OTHER PUBLICATIONS

John Regehr, "Ph.D. Proposal: Hierarchical Loadable Schedulers" Internet publication XP-002258703:1-10 (Apr. 27, 1999).

George M. Candea et al., "Vassal: loadable scheduler support for Multi-Policy scheduling" Proceedings of the 2$^{nd}$ Usenix Windows NT Symposium, Seattle, WA, XP009019604:157-166 (Aug. 3-5, 1998), ISBN: 1-880446-95-2.

Tatsuo Nakajima and Tokuda Hideyuki, "Implementation of Scheduling Policies in Real-Time Mach" Object Orientation In Operating Systems, 1992, Proceedings of the Second International Workshop on Dourdan, France (Sep. 24-25, 1992), IEEE Comput. Soc., XP002258897:165-169 (Sep. 24, 1992).

* cited by examiner

Primary Examiner—Khanh Dang
(74) Attorney, Agent, or Firm—Young Law Firm, P.C.

(57) ABSTRACT

A method of managing an allocation of a plurality of resources of a computer system adapted to support a plurality of processes includes a step of selecting one of a plurality of policy modules to query according to a master policy, each policy module being associated with and managing an allocation of resources required by one or more of the plurality of processes. A query may then be issued to the selected policy module. Responsive to the issued query, a request for allocation of one of the plurality of resources may be received. A resource allocation order specifying the requested one of the plurality of resources may then be issued to a dispatcher, the dispatcher being configured to bind selected resources to selected processes. The resource allocation order may then be executed, the executing step being effective to bind the requested one of the plurality of resources to the process or processes associated with the selected policy module.

37 Claims, 5 Drawing Sheets

METHODS AND SYSTEMS FOR MULTI-POLICY RESOURCE SCHEDULING

BACKGROUND OF THE INVENTION

1. Field of the Invention

The present invention relates generally to the dynamic allocation of resources in a computer system.

2. Description of the Related Art

Whenever a fixed set of system resources (e.g., shared data, input/output, storage space) is shared among a set of processes, a centralized resource dispatcher is usually charged with assigning and reclaiming these resources. Such scheduling is conventionally carried out according to a single policy, and this single policy is typically hard coded in the resource dispatcher. FIG. 1 shows an example of a system 100 including a single policy 102 for allocating and scheduling resources 104, 106 and 108 to applications and/or processes 110, 112 and 114 in a computer system, according to the related art. As shown therein, a single policy 102 grants resources to the applications 110, 112 and 114 as shown at 116, 118 and 120 according to some pre-established policy (such as round-robin, First In, First Out (FIFO)). Alternatively, the applications may synchronously or asynchronously request a needed resource from the policy 102 and dispatcher 102, as also suggested by arrows 116, 118 and 120. In any event, the single allocation/scheduling policy and dispatcher 102 may then selectively allocate resources 104, 106 and 108 to the applications 110, 112 and 114. That is, as shown in FIG. 1, the single allocation/scheduling policy and dispatcher 102 may bind resource 104 to application 1, bind resource 2 to application 3 and bind resource 3 to application 2 (for example).

Unfortunately, it is believed difficult or perhaps impossible to devise a single scheduling policy that is effective in optimally meeting the requirements of all present and future tasks in a software system that is reasonably versatile. For example, should a new application be added to the system 100 of FIG. 1, the single policy 102 may not efficiently allocate and dispatch resources thereto, as the system designer that originally designed the policy 102 more than likely had no prior knowledge of the resource requirements of the newly added application. The system designer is often forced to make tradeoffs, which provide, at best, only marginally acceptable service to those applications originally envisaged, as well as to those applications the system designer believes are reasonably likely to be run on the system 100.

There are two generally accepted schemes for improving the efficiency of resource allocation in a single policy environment. First, if the single policy is suitably parameterized and these parameters can be changed dynamically, it may be possible to influence the scheduling of resources at run time. The fact remains, however, that the same policy is applied to all processes and thus cannot satisfy their resource needs in an optimal manner. Second, the resources and processes or applications may be partitioned into classes (in a static or dynamic manner) such that all resources within a class are administered by the same policy. It then becomes possible to schedule resources within each class in an appropriate manner. However, because of this partitioning, processes and/or applications partitioned in one class may not access resources partitioned in other classes, and a new type of application or process will need to be made to fit within one of the existing classes, or another class may have to be created for the new process or application.

A problem common to both these schemes is that modifying parameters or partitioning processes/resources does not allow for on-the-fly creation of new resource-scheduling policies. Often, the system designer is faced with the difficult or impossible task of accurately predicting and implementing all of the possible resource allocation policies that current and future applications may require.

What are needed, therefore, are methods and systems for more efficiently allocating resources in a computer system.

SUMMARY OF THE INVENTION

It is, therefore, an object of the present invention to provide methods and systems for efficiently allocating resources in a computer system.

Accordingly, a computer system according to the present invention includes a resource, a process, a first policy module, a master policy and a dispatcher. The policy module is associated with the process and adapted at least to issue a resource allocation request to request an allocation of the resource to the process. The master policy is configured to query the first policy module according to a policy module query schedule, to receive the resource allocation request and to issue a corresponding resource allocation order. The dispatcher is configured to bind the required resource to the process according to the resource allocation order.

According to further embodiments, the process may be one of a plurality of processes and the first policy module may be one of a plurality of policy modules. At least one of the plurality of policy modules is associated with at least one of the plurality of processes and the master policy is adapted to selectably query the plurality of policy modules. The master policy may be adapted to query each of the plurality of policy modules according to a configurable statistical query distribution. Alternatively, the master policy may be adapted to query a selected one of the plurality of policy modules before querying any other one of the plurality of policy modules. The process may include an application. The resource may be one of a plurality of resources accessible to the computer system, such as, for example, a data structure, processing cycles, a storage device, shared memory, an I/O port, a process or another computer system. The system may further include a second policy module associated with the first policy module. The second policy module may be adapted to issue the resource allocation request when queried by the master policy when the first policy module does not issue the resource allocation request. The first policy module may include a selectably changeable policy module parameter. The value of the policy module parameter may influence the content of the resource allocation request. The policy module parameter may be selectably changeable by the process at run time, for example. The master policy module may include a selectably changeable master policy parameter that may be selectably changeable at run time. The value of the master policy parameter may influence the policy module query schedule of the master policy. The system may further include a third policy module, the third policy module being associated with the process and adapted to issue the resource allocation request when queried by the master policy. Some of the plurality of processes may be members of a class of processes, and at least one of the plurality of policy modules may be adapted to issue the resource allocation request on behalf of any member of the class of processes. Some of the plurality of resources may be members of a class of resources, and at least one of the plurality of policy modules may be adapted to issue a resource allocation request for any resource that is a member of the class of resources on behalf of a process or processes. The system may also include a policy data structure, the policy data structure including a reference to each of the plurality of policy modules that is associated with one or more of the plurality of processes. The master policy may be configured to query only those policy modules referenced in the policy data structure.

The system may further include one or more utility policy modules that are not associated with any of the plurality of processes and that may be configured to selectively carry out, when invoked by the master policy, a selective change of the master policy parameter and/or the execution of one or more predetermined jobs, for example. The policy data structure further may include references to these utility policy modules that are selectably invoked by the master policy. For example, a utility policy module may be configured to cause a re-generation of the policy data structure, at a selectable interval for example. The system may further include a second policy module and the first policy module may be adapted to identify the second policy module to the master policy as that policy module to query for the resource allocation request. The system may further include a resource data structure accessible to each of the plurality of policy modules. The resource data structure may include a reference to each one of the plurality of resources accessible to the computer system. One or more of the plurality of policy modules may be configured to access the resource data structure prior to (for example) issuing a resource allocation request.

The present invention is also a method of managing an allocation of a plurality of resources of a computer system adapted to support a plurality of processes, comprising the steps of selecting one of a plurality policy modules to query according to a master policy, each policy module of the plurality of policy modules being associated with and managing an allocation of resources required by at least one of the plurality of processes; issuing a query to the selected one of the plurality of policy modules; receiving a request for allocation of one of the plurality of resources in response to the issued query; issuing a resource allocation order to a dispatcher, the dispatcher being configured to bind selected resources to selected processes, the resource allocation order specifying the requested one of the plurality of resources, and executing the resource allocation order, the executing step being effective to bind the requested one of the plurality of resources to the at least one of the plurality of processes associated with the selected one of the plurality of policy modules.

For example, the master policy may be adapted to cause the selecting step to query each of the plurality of policy modules according to a configurable statistical query distribution. Alternatively, the master policy may be adapted to cause the selecting step to select one of the plurality of policy modules before selecting any other one of the plurality of policy modules, for example. When the plurality of policy modules includes a hierarchically lower policy module associated with the selected policy module, the selecting step may select the hierarchically lower policy module when the resource allocation request is not received from the selected policy module. One or more of the plurality of policy modules may be parameterized to include a policy module parameter, a value of which may influence the content of the resource allocation request. The method further may include a step of selectively changing the policy module parameter. Such a selective changing step may be carried out at run time, by the process or processes associated with the parameterized policy module, for example.

The master policy module may include a selectably changeable master policy parameter. The value of the master policy parameter may influence which of the plurality of policy modules is selected by the selecting step. The method may further include a step of setting a value of the master policy parameter at run time. Some of the plurality of processes may be members of a class of processes, and at least one of the plurality of policy modules may carry out a step of issuing a resource allocation request on behalf of any member of the class of processes. Some of the plurality of resources may be members of a class of resources. One or more of the plurality of policy modules may carry out a step of issuing a resource allocation request for any resource that is a member of the class of resources. The computer system further may include a policy data structure, the policy data structure including a reference to each of the plurality of policy modules that is associated with at least one of the plurality of processes and the master policy may cause the selecting step to select only from those policy modules referenced in the policy data structure.

The computer system may include one or more utility policy modules that are not associated with any of the plurality of processes. A utility policy module, when invoked by the master policy, may cause at least one predetermined step to be carried out, such as a master policy parameter setting step to set the master policy parameter and/or an executing step to execute a predetermined job, for example. The policy data structure further may include references to these utility policy modules. The predetermined job may include a step of re-generating the policy data structure at a selectable interval, for example. The computer system further may include a resource data structure accessible to each of the plurality of policy modules. The resource data structure may include a reference to each one of the plurality of resources accessible to the computer system. At least one of the plurality of policy modules may carry out a step of accessing the resource data structure prior to (for example) issuing a resource allocation request.

DESCRIPTION OF THE INVENTION

Functional Description

Figure 2:
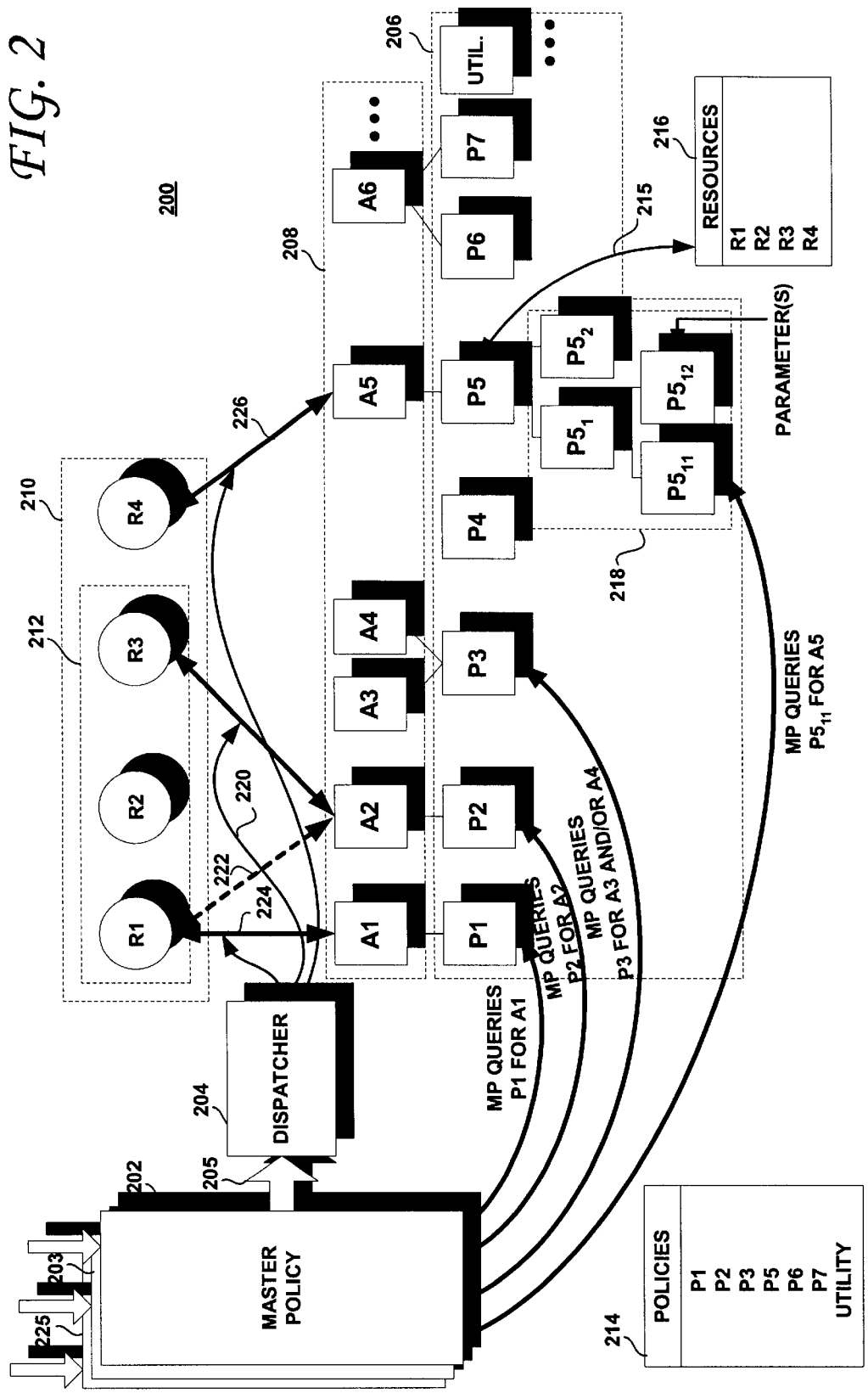
FIG. 2 is a diagram illustrating the methods and systems for managing the allocation of a plurality of resources of a computer system adapted to support a plurality of processes, according to an embodiment of the present invention.

FIG. 2 is a diagram showing a computer system 200 configured to schedule and allocate resources to applications and/or processes, according to the present invention. As shown therein, the computer system 200 of the present invention may include and/or have access to a plurality of resources 210, such as R1, R2, R3 and R4. Such resources may include anything that is of limited supply, such as a data structure, a block of shared memory, storage space, an input/output (I/O) port and the like. The system 200 may also be configured to execute a plurality of processes 208 (such as individual applications, processes, JAVA servlets, for example), referenced in FIG. 2 as A1, A2, A3, A4, A5 and A6.

Figure 1:
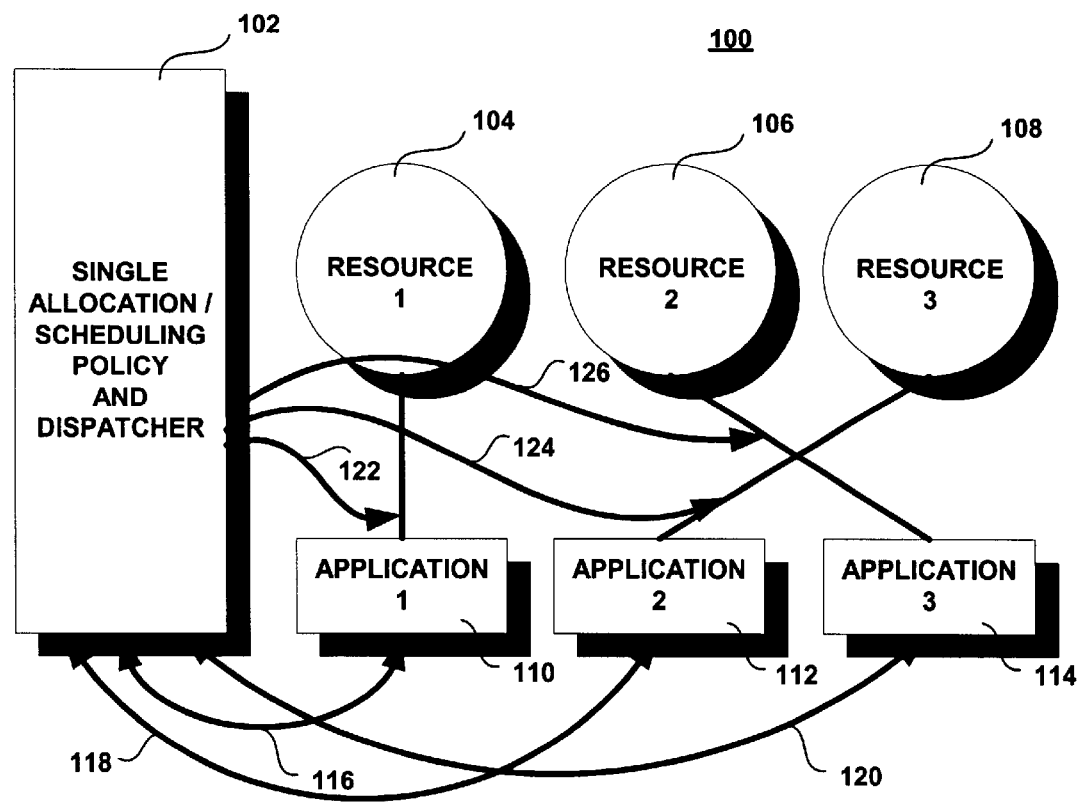
FIG. 1 is a diagram showing a single policy to allocate and schedule resources in a computer system, according to the related art.

Instead of a single integrated resource allocation, scheduling and dispatching policy module as shown at 102 in FIG. 1, the present invention envisages exporting the resource allocation decision making into the applications realm, so that each application or process (the two terms being used interchangeably herein) may decide what resource allocation and scheduling policy works best for their resource requirements. Accordingly, the present invention provides for each process A1, A2, A3, A4, A5 and A6 to have at least one resource allocation policy module associated therewith. In the illustrative example of FIG. 2, policy module P1 is associated with process A1, policy module P2 is associated with process A2, both processes A3 and A4 are associated with policy module P3. Policy module P4 is not currently associated with any process or application, policy module P5 is associated with process A5 and both policy modules P6 and P7 are associated with process A6. Lastly, a utility policy (described in further detail below) is not associated with any process or application. It is to be understood that FIG. 2 does not illustrate the entire universe of possibilities relative to processes and policy modules and that the system 200 may include a greater or lesser number of policy modules (as well as utility policy modules), processes and/or resources that are organized as shown in FIG. 2 or in a different manner altogether. Each of the policy modules P1, P2, P3, P5, P6 and P7 shown in FIG. 2, according to the present invention, is associated with at least one process running on the system 200 and is configured to request an allocation of one or more resources R1, R2, R3 and R4 for use by the process with which they are associated. In other words, each process A1, A2, A3, A4, A5 and A6 according to the present invention has at least one resource allocation policy associated therewith, which resource allocation policy is tailored to the specific resource requirements of the process with which it is associated. In this manner, the present invention allows multiple application or process-specific resource allocation and scheduling policy modules to concurrently coexist in the same system 200. The present invention is at least partially predicated upon the assumption that those who design and write the code for the applications and processes (such as shown at A1, A2, A3, A4, A5 and A6 in FIG. 2) running on a computer system are the very persons that are best suited to design how and when the resources (such as resources R1, R2, R3 and R4) are scheduled and allocated to the applications they have designed and written. Enabling the resource allocation and scheduling decisions for each process to be governed by at least one process-specific policy implemented by a policy module provides an environment wherein those that write the actual computer code for the process and/or applications to be run on the computer system to also design the most efficient resource allocation and scheduling policy therefor.

The system 200 also includes one or more master policy modules 202. According to an embodiment of the present invention, the master policy module 202 implements a master policy that is configured to query the policy modules (P1, P2 . . . ) according to a policy module query schedule. Responsive to such queries, the policy modules (P1, P2 . . . ) issue a resource allocation request that is then received by the master policy module 202. The resource allocation request issued by the policy modules (P1, P2 . . . ) includes an identification of the resource needed by the application(s) associated with the issuing policy module. Having received a resource allocation request from a queried policy (P1, P2 . . . ), the master policy module 202 may issue a corresponding resource allocation order 205 that orders a dispatcher module 204 to bind the resource requested by the queried policy to the process associated with the queried policy. The primary function of the dispatcher module 204 of the present invention is to bind specified resources to specified applications, as ordered by the master policy module 202. For example, responsive to a query from the master policy module 202, policy module P2 may issue a request for allocation of resource R3 (wherein R3 is an I/O port, for example). The master policy module 202 receives the policy module P2's request for allocation of resource R3 to A2 and issues an order 205 to the dispatcher module 204 to allocate resource R3 to application or process A2, if available. The dispatcher module 204 then receives this order 205 and binds the resource R3 to application A2, as suggested by arrow 220 in FIG. 2. After the dispatcher module 204 binds the requested resource to the application associated with the policy having issued the resource allocation request, the dispatcher module 204 may signal to the master policy module 202 that it has finished carrying out the resource allocation order 205 and request another resource allocation order 205 therefrom. Likewise, FIG. 2 shows resource R1 bound to process A1 and resource R4 bound to process A5. As shown in FIG. 2, the present invention effectively separates the resource allocation policy from the mechanism of binding resources to requesting applications.

According to the present invention, a plurality 206 of policy modules P1–P7 may concurrently dictate resource utilization policy for a plurality 208 of processes A1–A6. The master policy module 202, therefore, must make higher-level decisions as to which policy module P1–P7 is allowed to request resources at any given time. The master policy module 202, according to the present invention, makes this decision by choosing which policy module to query for a resource allocation request. Therefore, according to the present invention, the resource allocation and scheduling decisions are split among a "global" policy implemented by the master policy module(s) 202 and the application or process-specific policies implemented by the individual policy modules P1–P7.

The master policy module 202, according to an embodiment of the present invention, may be adapted and configured to query each of the plurality 206 of policy modules P1–P7 according to a configurable statistical query distribution. There are a variety of possible distributions that may be employed. For example, if policy modules P1, P2 and P3 were the only policy modules in the system 200, an exemplary distribution might follow a 20/70/10 query distribution in which 20% of the queries issued by the master policy module 202 are directed to policy module P1 70% of the queries are issued to policy module P2 and 10% of the queries issued by the master policy module 202 are directed to policy module P3. Any suitable distribution may be employed and implemented by the master policy module 202. For example, each of the policy modules P1–P6 may be queried in turn, in a round robin fashion. Alternatively still, the master policy module 202 may be adapted to query a selected one of the plurality 206 of policy modules P1–P7 before querying any other one of the plurality 206 of policy modules. For example, policy module P1 may be selected to be queried before any of the remaining policy modules P2–P7 are queried. Thereafter, if policy module P1 does not issue a resource allocation request to the master policy module 202, the remaining policy modules P2–P7 may be queried in turn, according to a predetermined order, or according to some predetermined query distribution as detailed above. Any desired query distribution may be implemented within the master policy module 202 to distribute resources to the plurality 208 of processes.

Sometimes it may be difficult to create a finite, discrete query distribution that accurately reflects the intended requirements of the system administrator. Indeed, minor deviations may lead to scheduling skews that may accumulate and become noticeable in the long term. For example, in the case of the 20/70/10 percentage query distribution described above, clustered queries to the same policy module (70% of the queries being issued to policy module P2, to use the example developed above, for example) may force the queried policy module to repeatedly forfeit its decision opportunity due to lack of "think time", which would effectively be robbing the policy module of its fair share of queries. For this reason, the global policy's data structures may be periodically regenerated, and the natural variability of the regeneration process ensures the desired scheduling behavior. The decision as to when such data structures may need to be regenerated may not be time-dependent, but may depend upon the amount of usage such data structures have experienced from the dispatcher module 204.

The policy modules P1–P7 need not always make a decision; that is, the policy modules P1–P7 may forfeit their opportunity to issue a resource allocation request to the master policy module 202 when queried thereby. Indeed, a queried policy module P1–P7 may not issue a resource allocation request. In that case, the master policy module 202 may move on and query the next policy module, based upon the predetermined query distribution, as detailed above. Alternatively, it is possible for a policy module to delegate the issuance of a resource allocation request to another, perhaps finer-grained, policy module. In that case, the master policy module 202 may invoke that finer grained policy module for a resource allocation request before moving on to the next policy module in the query distribution. Such a finer-grained policy module may be thought of as a hierarchically-lower policy module or modules, as shown at reference 218 in FIG. 2. Indeed, as shown at 218, policy modules $P5_1$ and $P5_2$ are associated with and are hierarchically lower than policy module P5. The master policy module 202 may be configured to selectably query one or both of these policy modules for a resource allocation request, depending upon the value of some parameter, external event or any definable measure. Likewise, policy module $P5_1$ may delegate its opportunity to request allocation of one or more resources R1–R4 to the further hierarchically lower policy modules $P5_{11}$ and/or $P5_{12}$ which will be provided the opportunity to issue a resource allocation request for resources on behalf of application or process A5.

According to the present invention, any of the policy modules P1, P2 . . . may include one or more selectably changeable policy module parameters, as shown in the case of policy module $P5_{12}$. The value of such a policy module parameter may influence the policy implemented by the policy module and may thus influence the content of any resource allocation request issued by that parameterized policy module. That is, the value of the policy module parameter(s) may change the identity of the resource requested by that policy module when queried by the master policy module 202. For example, the policy module parameter(s) may be changed at run time by the process with which the parameterized policy module is associated. Similarly, the master policy implemented by the master policy module 202 itself may be parameterized to include one or more master policy parameters that influence the policy module query schedule of the master policy. That is the value of the parameter(s) may change the order and/or frequency with which the master policy module 202 queries selected policy modules P1, P2 . . . Such master policy parameter(s) may also be selectively changed, at run time, for example.

According to further embodiments of the present invention, some of the plurality 208 of processes A1–A6 may be identified as members of a class of processes. For example, processes A1, A2, A3 and A4 may be members of a class of processes. For members of such a class of processes, one or more of the plurality 206 of policy modules P1–P7 may be adapted to issue the resource allocation request on behalf of any member (A1, A2, A3 or A4) of the class of processes. Such a grouping of processes into classes may be appropriate when such processes share similar resource requirements that may be addressed by a single policy module or a group of policy modules. Similarly, one or more of the plurality 210 of resources R1, R2, R3 and R4 may be identified (logically grouped) as members of a class of resources, such as shown at reference number 212 in which resources R1, R2 and R3 form part of a same class of resources. In that case, one or more of the plurality 206 of policy modules may be adapted to issue a resource allocation request for any resource (in this case, R1, R2 or R3) that is a member of the class 212 of resources on behalf of an associated process.

The system 200 of FIG. 2 may also include a policy data structure, as shown at 214. Such a policy data structure 214 may, according to an embodiment of the present invention, include a reference to each of the plurality 206 of policy modules that is associated with at least one of the plurality of processes A1–A6. The master policy module 202 may then be configured to access the policy data structure 214 at a selectable interval (for example) and to query only those policy modules referenced in the policy data structure 214. In the illustrative example of FIG. 2, each of the policy modules P1–P7 is associated with at least one process A1–A6, but for policy module P4, which is not associated with any of the processes A1–A6. Therefore, the policy data structure lists policy modules P1, P2, P3, P5 and P7, but not policy module P4, as it is not associated with any of the processes A1–A6. Thus, when a process A1–A6 has finished executing, its corresponding policy module(s) may be de-listed from the policy module data structure 214 and also removed from the query distribution used by the master policy implemented by master policy module 202, to thereby achieve greater efficiencies in the querying of policy modules P1–P7 by the master policy module 202.

The policy module structure 214 may also include a reference to each of the utility policy modules (there may be one or more of such utility policy modules), even though policy module utility is not associated with any of the processes A1–A6. According to the present invention, the utility policy module may be configured to carry out a variety of tasks, when invoked by the master policy module(s) 202. For example, the utility policy module may be configured to selectively change the master policy parameter(s). For example, the utility policy module may change one or more master policy parameters so that the master policy module 202 behaves differently according to the time of day for example. For example, the master policy module(s) 202 may be configured so as to optimize the execution of email handling applications between the hours of 8:30 to 10:30 in the morning and then again between 3:00 and 4:30 in the afternoon. Alternatively, the utility policy module may be configured to carry out one or more predetermined jobs, such as system maintenance jobs (such as re-starting a server, compacting mailboxes and the like), or the re-generation of the policy data structure 214 itself. Alternatively still, when invoked by the master policy module 202, the utility policy may cause one of the other master policies 203 or 225 to become active. The query distribution may, as alluded to above, include a reference to the utility policy module. The utility policy module may be configured to carry out predetermined tasks each time the master policy module 202 traverses the query distribution data structure and reaches the reference to the utility policy module. Alternatively, the utility policy module may keep track of how many times the master policy module 202 has traversed the query distribution structure and, when it hits a predetermined threshold, the utility policy module may cause a predetermined task (such as those exemplary tasks listed above) to be executed or may regenerate the query distribution data structure in order to achieve accurate scheduling in the long term.

The system 200 illustrated in FIG. 2 may also include a resource data structure, as shown at reference 216. Such a resource data structure may be accessible to each of the plurality of policy modules P1–P7 and may include a reference to each one of the plurality 210 of resources R1, R2, R3 and R4 within or accessible to the computer system 200. When resources are added to or made available or accessible to the system 200, references to those resources may be added to the structure 216 using, for example, a publication model whereby newly added resources push a unique resource identifier into the resource data structure 216, for example. Using such a resource data structure 216, all policy modules P1–P7 may be made aware or apprise themselves of newly available resources. A policy module P1–P7 might, for example, view its universe of resources as only those that were present at startup of the system 200. Alternatively, a policy module P1–P7 may be configured to consult (as suggested by arrow 215 in FIG. 2) the resource data structure 216 before making a decision as to which resource to identify in the resource allocation request it issues to the master policy module 202. The resource data structure 216 may not only list the available or accessible resources R1–R4, but may also list their status such as, for example, idle or busy, available or locked.

For example, resource R1 might be bound to application A1, as shown at 224. However, when queried by the master policy module 202, the policy module P2 associated with process A2 may issue a resource allocation request identifying R1 as that resource currently needed by process A2. One possible outcome of such a scenario is that the master policy module 202 does not issue a resource allocation order 205 to the dispatcher module 204 ordering the scheduler module 204 to bind resource R1 to process A2. Another alternative is that the master policy module 202 issues a resource allocation order 205 to the dispatcher module 204 ordering the dispatcher module 204 to break application A1's lock on resource R1 and to bind resource R1 to process A2 instead, as shown at 222. Alternatively still, policy module P2 might consult the global list of available resources published in the resource data structure 216, see that resource R3 is available and currently idle and decide to use R3 instead of R1. Policy module P2, when queried by the master policy module 202, may then issue a resource allocation request to the master policy module 202 identifying resource R3 as that resource needed by its associated process; namely process A2. The resource data structure 214, therefore, enables each policy module P1–P7 to understand what resources are available to the system 200 and the status of each of these resources. Alternatively still, each of the policy modules may subscribe to receive notifications of events that involve the particular resource or set of resources that they may require. Thereafter, processes that monitor events and resources within the system may publish such events to those policy modules P1–P7 that have subscribed to receive events concerning the resources in which they are interested. In this manner, the policy modules P1–P7 may internally maintain the status of all resources that their associated process (or processes) are likely to require.

The present invention is believed to have far reaching applicability. For example, any caching system may benefit from application-specific policy modules that manage the maintenance of the cached data according to the present invention. Data caching systems typically use a fixed least recently used (LRU) policy for evicting data blocks from the cache. For example, resource R4 may be a cache memory and policy module $P5_2$ (for example) may manage (among other duties) access to the data blocks cached in cache memory R4 for application A5. The policy module $P5_2$ may notify the application A5 that some of the data blocks cached in resource R4 need to be evicted, and application A5 may then indicate to policy module $P5_2$ which blocks it is not likely to need anymore, whereupon policy module $P5_2$ may issue a resource allocation request when next queried by the master policy module 202 and identify the resource R4 (or the data blocks indicated as not needed by application A5) as that resource required by its associated application A5. Thereafter, the master policy module 202 may issue a resource allocation order 205 to dispatcher module 204 ordering it to bind resource R4 to application A5 or to the application that maintains the cache memory resource R4, as shown at 226 in FIG. 2. The data blocks no longer needed by application A5 may then be evicted or purged from the resource R4. Such application-driven data block eviction may dramatically improve the hit rate of the cache memory R4. The core reason for this improvement is that the application is assumed to have a much better understanding of its data access patterns than the operating system and may thus be better placed to make decisions regarding cached data blocks.

Figure 3:
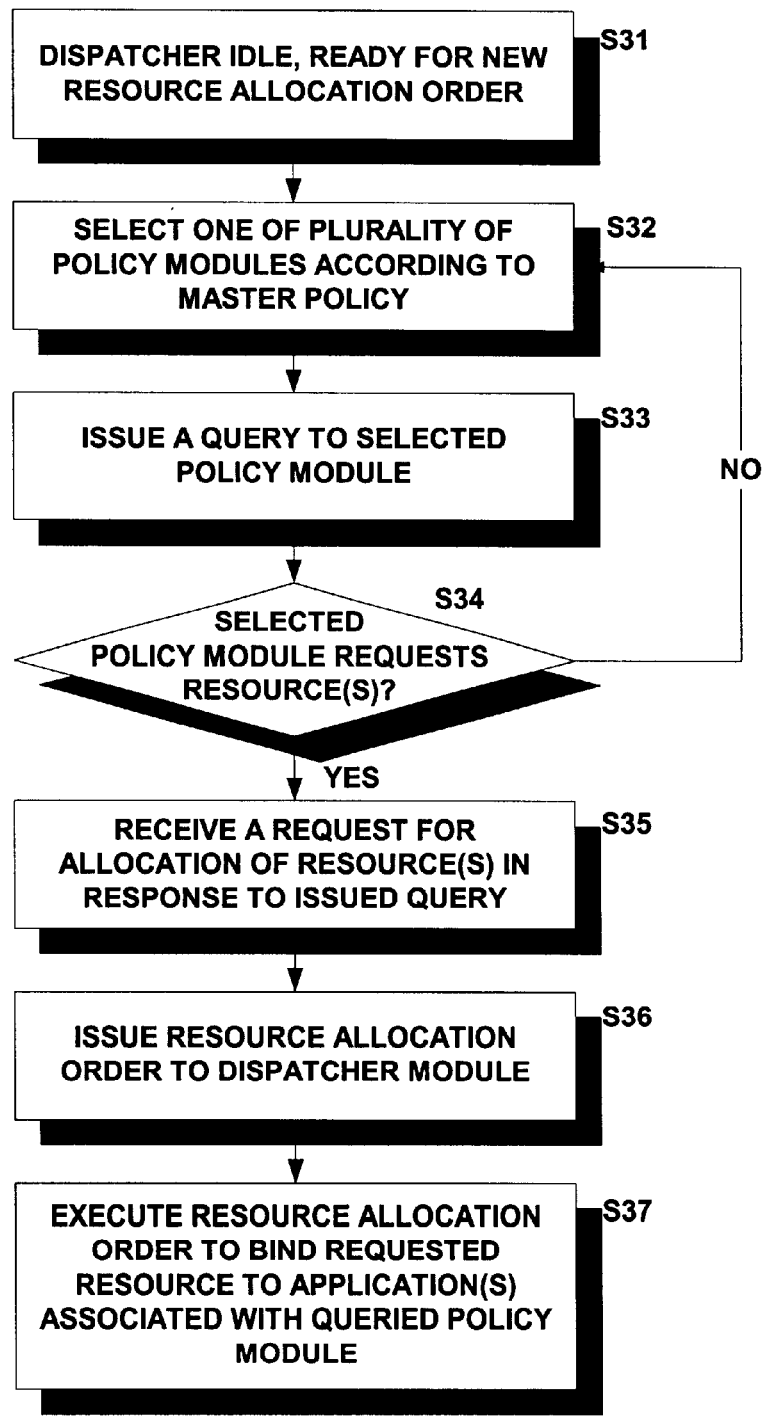
FIG. 3 is a flowchart of a method for managing the allocation of a plurality of resources of a computer system adapted to support a plurality of processes, according to an embodiment of the present invention.

FIG. 3 is a flowchart of a method for managing the allocation of a plurality of resources of a computer system adapted to support a plurality of processes, according to an embodiment of the present invention. As shown, step S31 shows the dispatcher module 204 idle and ready for a new resource allocation order 205 from the master policy module 202. For example, the dispatcher module 204 may have just completed executing the last resource allocation order 205. As shown at S32, the master policy module 202 may then select one of the plurality policy modules P1–P7 to query according to a master policy that specifies a weighted query distribution (for example), as disclosed above. Each of the policy modules P1–P7 (although seven such policy modules are shown in FIG. 2 and discussed herein, it is understood that the present invention is not to be limited to any number of such policy modules) is associated with and manages the allocation of resources (such as shown at R1–R4 in FIG. 2) required by one or more of the plurality of processes (such as A1–A6 shown in FIG. 2). Step S33 calls for the master policy module 202 to issue a query to the selected one of the plurality of policy modules. As indicated at step S34, if the queried policy module does not request a resource (e.g., makes a NULL request), the method may revert to step S32.

If the queried policy module does request a resource or resources, the queried policy module may formulate and issue a resource allocation request to the master policy module 202. This resource allocation request may then be received by the master policy module 202, as shown at S35. At S36, the master policy module 202 may then issue a resource allocation order 205 to the dispatcher module 204, which module 204 is configured to bind selected resources to selected processes. The resource allocation order 205, according to the present invention, specifies the requested one of the plurality of resources. The dispatcher module 204 may then, as shown at S37, execute the resource allocation order 205, the executing step being effective to bind the requested one of the plurality of resources to the process or processes associated with the queried policy module.

Hardware Description

Figure 4:
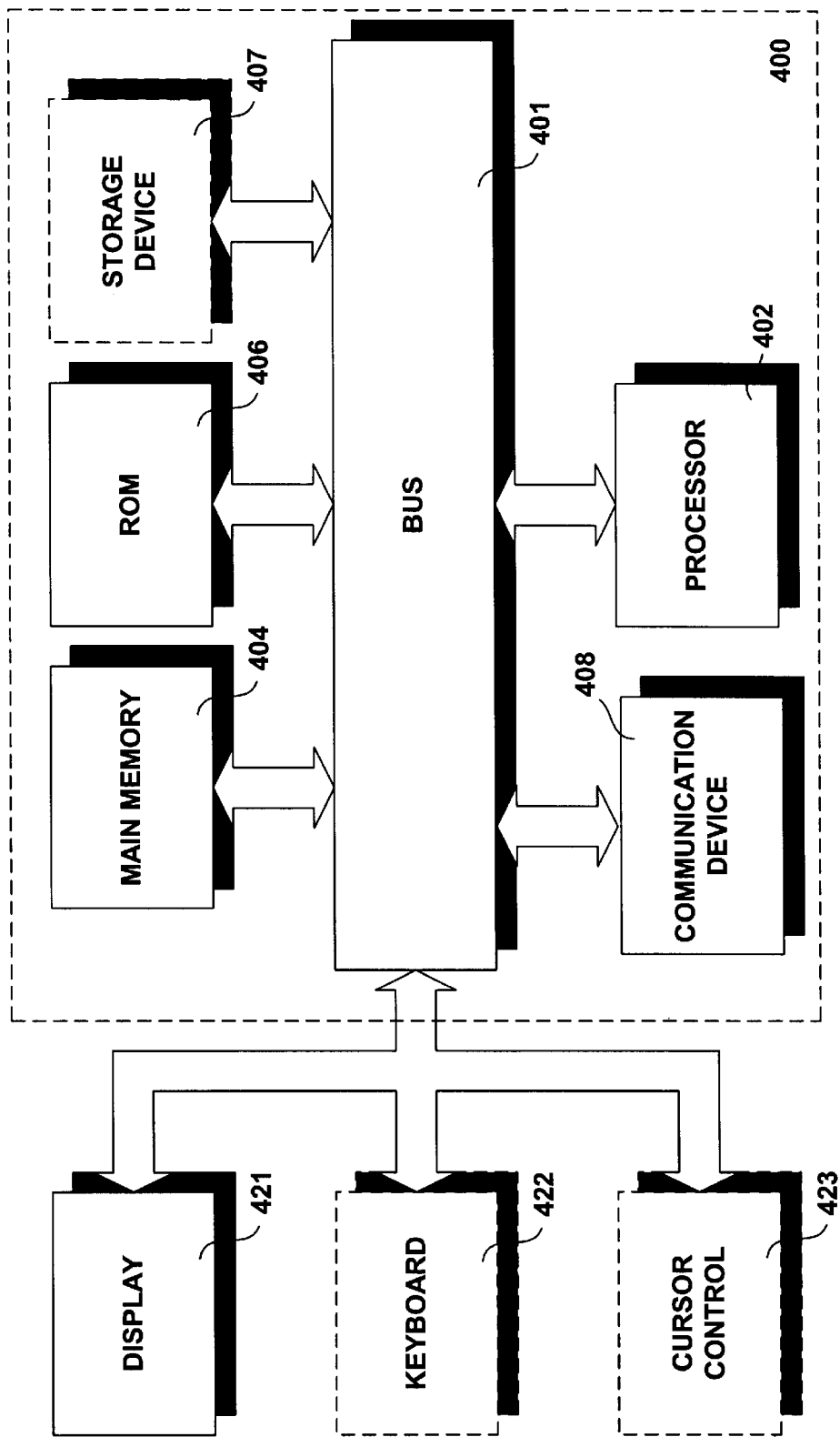
FIG. 4 is a block diagram of a computer with which the present invention may be practiced.

FIG. 4 illustrates a block diagram of a computing device 400 with which an embodiment of the present invention may be implemented. Computing device 400 includes a bus 401 or other communication mechanism for communicating information, and a processor 402 coupled with bus 401 for processing information. Computing device 400 further comprises a random access memory (RAM) or other dynamic storage device 404 (referred to as main memory), coupled to bus 401 for storing information and instructions to be executed by processor 402. Main memory 404 also may be used for storing temporary variables or other intermediate information during execution of instructions by processor 402. Computing device 400 may also include a read only memory (ROM) and/or other static storage device 406 coupled to bus 401 for storing static information and instructions for processor 402. A data storage device 407, such as a magnetic disk or optical disk, may be coupled to bus 401 for storing information and instructions. A communication device 408, such as a modem or network (such as Ethernet, for example) card is also coupled to the bus 401 to provide access to a network, such as shown at 112 in FIG. 1.

The computing device 400 may also be coupled via bus 401 to a display device 421, such as a cathode ray tube (CRT), for displaying information to a computer user. An alphanumeric input device 422, including alphanumeric and other keys, is typically coupled to bus 401 for communicating information and command selections to processor 402. Another type of user input device might be the user's own voice or cursor control 423, such as a mouse, a trackball, or cursor direction keys for communicating direction information and command selections to processor 402 and for controlling cursor movement on display 421.

The present invention is related to the use of computing device 400 configured to schedule resources using multiple policy modules, as disclosed above. According to one embodiment, the processing may be carried out by one or more computing devices 400 in response to processor(s) 402 executing sequences of instructions contained in memory 404. Such instructions may be read into memory 404 from another computer-readable medium, such as data storage device 407 and/or from a remotely located server. Execution of the sequences of instructions contained in memory 404 causes processor(s) 402 to implement the functionality described above. In alternative embodiments, hard-wired circuitry may be used in place of or in combination with software instructions to implement the present invention. Thus, the present invention is not limited to any specific combination of hardware circuitry and software.

Figure 5:
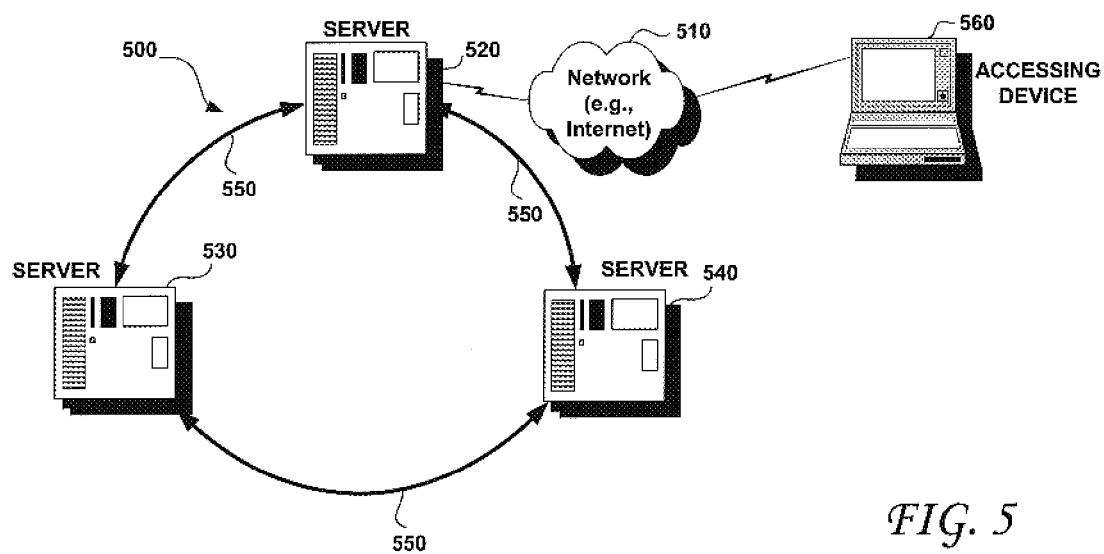
FIG. 5 is a block diagram of an exemplary e-commerce backend in which the present invention may be implemented.

The present invention is particularly well suited to deployment within, for example, high-speed servers running an e-commerce backend 500, as shown in FIG. 5. As shown therein, the backend 500 may be coupled to a computer network 510 including, for example, the Internet. Such an e-commerce backend 500 may include one or more servers (of which an exemplary three are shown at reference numerals 520, 530 and 540) to service requests from a plurality of accessing devices, an example of which is shown at 560. The accessing device 560 may include a computer, a hand-held device and/or any other computing appliance able to access the network 510. The servers 520, 530, 540 may be coupled to one another via a high speed interconnect, as shown at 550. Each of the servers 520, 530 and 540 may support a plurality of processes and the present invention may advantageously be deployed within one or more of the servers 520, 530 and 540 to manage the allocation of resources available to the server, in the manner described above.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer system, comprising:

a resource;

a process configured to selectively utilize the resource;

a first policy module, the first policy module being associated with the process and configured at least to issue a resource allocation request to request an allocation of the resource to the process;

a master policy, the master policy being configured to issue a query to the first policy module according to a policy module query schedule, to receive, responsive to the issued query, the resource allocation request from the first policy module and to issue a corresponding resource allocation order responsive to the received resource allocation request, and a dispatcher, the dispatcher being configured to bind the required resource to the process according to the resource allocation order.

2. The computer system of claim 1, wherein the process is one of a plurality of processes and the first policy module is one of a plurality of policy modules, at least one of the plurality of policy modules being associated with at least one of the plurality of processes and wherein the master policy is configured to selectably query the plurality of policy modules.

3. The computer system of claim 2, wherein the master policy is configured to query each of the plurality of policy modules according to a configurable statistical query distribution.

4. The computer system of claim 2, wherein the master policy is configured to query a selected one of the plurality of policy modules before querying any other one of the plurality of policy modules.

5. The computer system of claim 1, wherein the process includes an application.

6. The computer system of claim 1, wherein the resource is one of a plurality of resources accessible to the computer system.

7. The computer system of claim 1, wherein the resource is selected from a group consisting of a data structure, processing cycles, a storage device, shared memory, an I/O port, a process and another computer system.

8. The computer system of claim 1, further including a second policy module associated with the first policy module, the second policy module being configured to issue the resource allocation request when queried by the master policy when the first policy module does not issue the resource allocation request.

9. The computer system of claim 1, wherein the first policy module includes a selectably changeable policy module parameter, a value of the policy module parameter influencing a content of the resource allocation request.

10. The computer system of claim 9, wherein the policy module parameter is selectably changeable by the process at run time.

11. The computer system of claim 1, wherein the master policy module includes a selectably changeable master policy parameter, a value of the master policy parameter influencing the policy module query schedule of the master policy.

12. The computer system of claim 11, wherein the master policy parameter is selectably changeable at run time.

13. The computer system of claim 1, further including a second policy module, the second policy module being associated with the process and configured to issue the resource allocation request when queried by the master policy.

14. The computer system of claim 2, wherein some of the plurality of processes are members of a class of processes, and wherein at least one of the plurality of policy modules is configured to issue the resource allocation request on behalf of any member of the class of processes.

15. The computer system of claim 6, wherein some of the plurality of resources are members of a class of resources, and wherein at least one of the plurality of policy modules is configured to issue a resource allocation request for any resource that is a member of the class of resources on behalf of a process.

16. The computer system of claim 2, further including a policy data structure, the policy data structure including a reference to each of the plurality of policy modules that is associated with at least one of the plurality of processes, wherein the master policy is configured to query only those policy modules referenced in the policy data structure.

17. The computer system of claim 11, further including a utility policy module that is not associated with any of the plurality of processes and that is configured to selectively carry out, when invoked by the master policy, at least one of a selective change of the master policy parameter and the execution of at least one predetermined job.

18. The computer system of claim 16, wherein the policy data structure further includes a reference to a utility policy module that is selectably invoked by the master policy, the utility policy module being configured to selectively cause at least one of a selective change of the master policy parameter and an execution of at least one predetermined job.

19. The computer system of claim 18, wherein the utility policy module is configured to cause a re-generation of the policy data structure at a selectable interval.

20. The computer system of claim 1, further comprising a second policy module and wherein the first policy module is configured to identify the second policy module to the master policy as that policy module to query for the resource allocation request.

21. The computer system of claim 6, further including a resource data structure that is accessible to each of the plurality of policy modules, wherein the resource data structure includes a reference to each one of the plurality of resources accessible to the computer system.

22. The computer system of claim 21, wherein at least one of the plurality of policy modules is configured to access the resource data structure prior to issuing a resource allocation request.

23. A method of managing an allocation of a plurality of resources of a computer system configured to support a plurality of processes, comprising the steps of:

selecting one of a plurality policy modules to query according to a master policy, each policy module of the plurality of policy modules being associated with and managing an allocation of resources required by at least one of the plurality of processes;

issuing a query to the selected one of the plurality of policy modules;

receiving a request for allocation of one of the plurality of resources in response to the issued query;

responsive to the received request for allocation, issuing a resource allocation order to a dispatcher, the dispatcher being configured to bind selected resources to selected processes, the resource allocation order specifying the requested one of the plurality of resources, and executing the resource allocation order, the executing step being effective to bind the requested one of the plurality of resources to the at least one of the plurality of processes associated with the selected one of the plurality of policy modules.

24. The method of claim 23, wherein the master policy is configured to cause the selecting step to query each of the plurality of policy modules according to a configurable statistical query distribution.

25. The method of claim 23, wherein the master policy is configured to cause the selecting step to select one of the plurality of policy modules before selecting any other one of the plurality of policy modules.

26. The method of claim 23, wherein when the plurality of policy modules includes a hierarchically lower policy module associated with the selected policy module, the selecting step selects the hierarchically lower policy module when the resource allocation request is not received from the selected policy module.

27. The method of claim 23, wherein a policy module of the plurality of policy modules is parameterized to include a policy module parameter, a value of which influences a content of the resource allocation request and wherein the method further includes a step of selectively changing the policy module parameter.

28. The method of claim 27, wherein the selective changing step is carried out at run time by a process associated with the parameterized policy module.

29. The method of claim 23, wherein the master policy module includes a selectably changeable master policy parameter, a value thereof influencing which of the plurality of policy modules is selected by the selecting step.

30. The method of claim 29, further comprising a step of setting a value of the master policy parameter at run time.

31. The method of claim 23, wherein some of the plurality of processes are members of a class of processes, and wherein at least one of the plurality of policy modules carries out a step of issuing a resource allocation request on behalf of any member of the class of processes.

32. The method of claim 23, wherein some of the plurality of resources are members of a class of resources, and wherein at least one of the plurality of policy modules carries out a step of issuing a resource allocation request for any resource that is a member of the class of resources.

33. The method of claim 23, wherein the computer system further includes a policy data structure, the policy data structure including a reference to each of the plurality of policy modules that is associated with at least one of the plurality of processes, wherein the master policy causes the selecting step to select only from those policy modules referenced in the policy data structure.

34. The method of claim 29, wherein the computer system includes a utility policy module that is not associated with any of the plurality of processes and wherein the utility policy module, when invoked by the master policy, causes at least one predetermined step to be carried out, the at least one predetermined step being selected from a group including a master policy parameter setting step to set the master policy parameter and an executing step to execute a predetermined job.

35. The method of claim 33, wherein the policy data structure further includes a reference to a utility policy module and wherein the utility policy module, when invoked by the master policy, causes at least one predetermined step to be carried out, the at least one predetermined step being selected from a group including a master policy parameter setting step to set the master policy parameter and an executing step to execute a predetermined job.

36. The method of claim 35, wherein the predetermined job includes a step of re-generating the policy data structure at a selectable interval.

37. The method of claim 23, wherein the computer system further includes a resource data structure tat is accessible to each of the plurality of policy modules, wherein the resource data structure includes a reference to each one of the plurality of resources accessible to the computer system and wherein at least one of the plurality of policy modules carries out a step of accessing the resource data structure prior to issuing a resource allocation request.

* * * * *